United States Patent
Barclay et al.

(10) Patent No.: US 8,332,198 B1
(45) Date of Patent: Dec. 11, 2012

(54) DATA GENERATION AND COLLECTION FROM A REAL-TIME SYSTEM FOR NON-REAL-TIME SOFTWARE SIMULATION

(75) Inventors: Michael Barclay, Swallowcliffe (GB); Terry Lynn Cole, Austin, TX (US); Harish Kutagulla, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 2077 days.

(21) Appl. No.: 11/086,881

(22) Filed: Mar. 22, 2005

(51) Int. Cl.
*G06F 17/50* (2006.01)
(52) U.S. Cl. ........................................... 703/14
(58) Field of Classification Search .............. 703/14
See application file for complete search history.

(56) References Cited

U.S. PATENT DOCUMENTS

| | | | | |
|---|---|---|---|---|
| 3,924,109 | A * | 12/1975 | Jhu et al. ................ | 714/736 |
| 5,233,628 | A * | 8/1993 | Rappaport et al. ....... | 375/224 |
| 6,618,696 | B1 * | 9/2003 | Dean et al. .............. | 703/13 |
| 2003/0009676 | A1 | 1/2003 | Cole et al. ............... | 713/189 |
| 2003/0031148 | A1 | 2/2003 | Schmidt et al. .......... | 370/337 |

OTHER PUBLICATIONS

"Microsoft Press Computer Dictionary Second Edition" Microsoft Press. 1994. p. 192 and 361-362.*
Nokia "Enhanced Data Rates for GSM Evolution EDGE" Nokia 1999.*
Merriam Webster's Collegiate Dictionary Tenth Edition. 1997 p. 984.*
Microsoft's Computer Dictionary Second Edition. 1994 p. 192.*
J. Thomson et al., "An Integrated 802.11a Baseband and MAC Processor," http://nova.stanford.edu/~bbaas/ps/isscc2002_slides.pdf.

* cited by examiner

*Primary Examiner* — Ben Rifkin
(74) *Attorney, Agent, or Firm* — Hamilton & Terrile, LLP; Michael Rocco Cannatti

(57) ABSTRACT

A method and apparatus for testing the functionality of a circuit design uses working system data that is recorded in real-time to stimulate and/or verify a software simulation of the circuit design that does not run in real-time. In a selected embodiment, a system for simulating and verifying a software model of a baseband module circuit design is described in connection with using real-time input and output data captured from a corresponding circuit in a reference platform. The captured real-time data may include digital baseband I/Q samples and/or extracted control data pertaining to the signal level, channel frequency, gain, output power, frequency offset, DC offset, or the like. The captured data may be regenerated for use as a stimulus for the software model of the circuit design and/or to verify the functionality of the design. Additional processing of the captured data can remove non-idealities that may be present in the reference platform, and can synchronize the regeneration of the captured data with the timing requirements of the non-real-time software model.

20 Claims, 3 Drawing Sheets

DATA GENERATION AND COLLECTION FROM A REAL-TIME SYSTEM FOR NON-REAL-TIME SOFTWARE SIMULATION

BACKGROUND OF THE INVENTION

1. Field of the Invention

The present invention relates generally to the field of integrated circuit design and testing. In one aspect, the present invention relates to an improved method, system and apparatus for a simulating a digital circuit, such as a modem or baseband processing unit in a mobile phone.

2. Description of the Related Art

Integrated circuits are typically designed by starting off with a higher or abstracted level description of a design, and then developing more detailed level descriptions (such as RTL and Schematic) of the design, resulting in a detailed description of the circuit design. As part of the design process, it may be necessary to simulate all or part of an integrated circuit design in order to verify that the circuit design works properly. As integrated circuits are produced with greater and greater levels of circuit density and complexity, the circuit designs are increasingly broken into subparts or modules which are separately designed and verified. Conventional approaches for verifying the functional performance of a circuit design include performing simulations using a software model for the entire circuit design. While there are verification tools available to assist with the design of large and complex electronic systems (such as digital multi-processor systems), such tools may not be able to simulate only part of the circuit design. In addition, such digital circuit verification tools are not particularly well suited for simulating analog components. This can be a problem if a circuit design simulation relies on stimulus input from an analog circuit, in which case the simulation is only as good as the data generated by the analog circuit simulator. Another potential problem with conventional design techniques arises when a model for a first module in the circuit is completed before a model for, a second, required module is ready, thereby delaying the simulation of the first module until the model for the second module is completed.

Therefore, a need exists for an improved simulation tool and methodology for use in verifying the design and operation of digital circuit modules in a wireless communications device. Further limitations and disadvantages of conventional systems will become apparent to one of skill in the art after reviewing the remainder of the present application with reference to the drawings and detailed description which follow.

SUMMARY OF THE INVENTION

By capturing and recording real-time signal inputs or outputs for a test circuit on a reference system platform, these signals can be used as stimulus signals for the simulation of the test circuit. For example, the digital baseband I/Q samples from the transmit data that is sent to an RF modulator in a reference platform may be recorded as captured signals. In addition, control data sent to the baseband module in the reference platform may also be extracted and recorded. The captured signals may then be used as input stimuli for use with a software model of a baseband module in order to simulate the transmit operation of a digital baseband module and to verify the functionality of the baseband module design. In addition, the captured signals may be processed in software to remove non-idealities (such as frequency offset or DC offset) that may be present in the reference platform. As a result, simulation data may be efficiently fed into a software model of the test circuit, and the transmit data that is sent out may be checked.

In accordance with various embodiments of the present invention, a method, system and apparatus are provided for simulating a circuit design (such as design for a baseband processing module) which may be implemented as an article of manufacture having a recordable medium for storing executable instructions and data. One or more processing devices execute the instructions and data to perform non-real time software simulation of a circuit model design, a representation of which is stored in memory. As part of the simulation of the circuit model design, real time signals (digital baseband I/Q samples, data and/or control information) captured from a reference circuit platform (such as a mobile device that includes a baseband module circuit) are retrieved from memory or a storage device, and regenerated in whole or in part as an input stimulus signal that is synchronized with the simulation of the circuit model design, thereby generating simulation results. For example, the transmit operation of a baseband processing module design may be verified by regenerating captured input data and control information as an input stimulus signal, applying the input stimulus signal during simulation of the baseband processing module design, and then comparing the simulation results with regenerated digital baseband I/Q output samples (captured from the reference baseband module circuit) to verify the baseband processing module design. The technique may be applied in reverse to verify the receive operation of a baseband processing module design, so that captured input digital baseband I/Q samples to a reference baseband module circuit are regenerated as an input stimulus signal during simulation of the baseband processing module design, and where the captured baseband module circuit output signals are regenerated and compared to the simulation results to verify the baseband processing module design. As will be appreciated, the regeneration of the real time signals may include removing non-idealities present in the captured real time signals. The simulation results are then compared with at least some of the captured real time signals to verify the circuit model design.

The objects, advantages and other novel features of the present invention will be apparent to those skilled in the art from the following detailed description when read in conjunction with the appended claims and accompanying drawings.

DETAILED DESCRIPTION

A method and apparatus for an improved simulation tool and methodology for use in verifying the design and operation of digital circuit modules is described. While various details are set forth in the following description, it will be appreciated that the present invention may be practiced without these specific details, and that numerous implementation-specific decisions may be made to the invention described herein to achieve the developer's specific goals, such as compliance with system-related and business-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Figure 1:
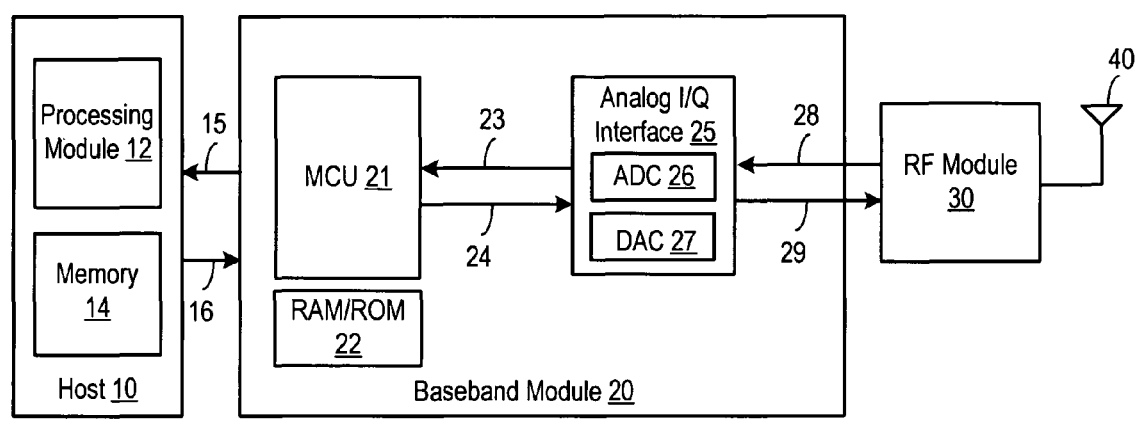
FIG. 1 depicts a block diagram representation of an exemplary wireless communications device.

While the present invention may be used with a variety of circuit designs, FIG. 1 depicts a block diagram representation of an exemplary wireless communications device 1 in which the circuit simulation techniques of the present invention may be used, though it will be appreciated that the present invention may also be implemented on mobile devices, such as personal digital assistants, mobile or cellular phones, smart phones and other mobile devices that include programmable capabilities such as telecommunications, global position system (GPS) detection, camera or video imaging, multimedia messaging (MMS), Internet features and the like. In addition, the present invention may be implemented in a mobile computing device using a software modem to communicate in accordance with a wireless communication protocol, such as GSM, V.90, ADSL, HomePNA, Wireless LAN, etc.

As depicted in FIG. 1, the communication device 1 includes a host or applications processing unit 10, a modem or baseband module 20, a radio or RF module 30 and an antenna 40 for transmission and reception over a wireless communication link using an industry standard signal modulation and communication protocol, such as IEEE 802.11, 802.15, 802.16, 802.18, 802.19, 802.20, Bluetooth (BT), advanced mobile phone services (AMPS), digital AMPS, GSM, CDMA, LMDS, MMDS and/or variations thereof. For clarity and ease of understanding, not all of the elements making up the wireless communications device 1 are described in detail. Such details are well known to those of ordinary skill in the art, and may vary based on the particular computer vendor and microprocessor type.

In the depicted wireless communication device 1, RF signals received at the antenna 40 are amplified at the RF module 30 and then mixed with one or more local oscillations to convert the amplified RF signal into baseband signals or intermediate frequency (IF) signals which may be filtered or otherwise modulated to generate analog I/Q signals 28. On the transmit side, RF module 30 mixes the analog I/Q signals 29 with one or more local oscillations and amplifies the resulting RF signal for transmission on the antenna 40.

Connected to the RF module 30 is a modem or baseband module 20 which includes one or more MCUs 21 for implementing a media-specific access control (MAC) protocol layer module and a physical layer module (PHY), and an analog I/Q interface 25. At the analog I/Q interface 25, analog I/Q data 28 received from the RF module 30 is converted to digital I/Q data 23 by the analog-to-digital converter (ADC) 26. The analog I/Q interface 25 also includes a digital-to-analog converter (DAC) 27 for converting digital I/Q data 24 to analog I/Q data 29 that is provided to the RF module 30. As will be appreciated, the baseband module 20 may be implemented with a communications processor and an associated memory for storing and executing instructions that control the access to the physical transmission medium in the wireless network.

The host device 10 includes a processing module 12 and a memory 14. The host will include other interfaces, buses, devices, and/or subsystems, depending on the implementation desired. The processing module 12 and memory 14 execute the corresponding instructions that are typically done by the host device. For example, in a cellular telephone device, the processing module 12 performs the corresponding communication functions in accordance with a particular cellular telephone standard.

In a wireless communications device, the modem or baseband module 20 may be implemented with programmable logic circuits (e.g., FPGA, PLD, etc.), or with one or more programmable hardware cores (such as a microcontroller unit (MCU) and/or a digital signal processor (DSP)) that may be adaptably programmed for different applications. Because a modem unit is a device that is designed to optimally transmit data over a particular, specified channel, the design process must take into account the characteristics of the channel and the required performance of the modem for that particular channel when selecting the structure of the modem and various modem parameters. Due to the complexity of the design process, it is necessary to simulate the design and operation of the modem and the rest of the wireless communications device in order to verify the modem design. To overcome the various limitations of conventional verification tools, the present invention provides a system and methodology for generating and recording real-time data from a reference working system and using the recorded data with non-real-time software simulation of a module for the system.

Figure 2:
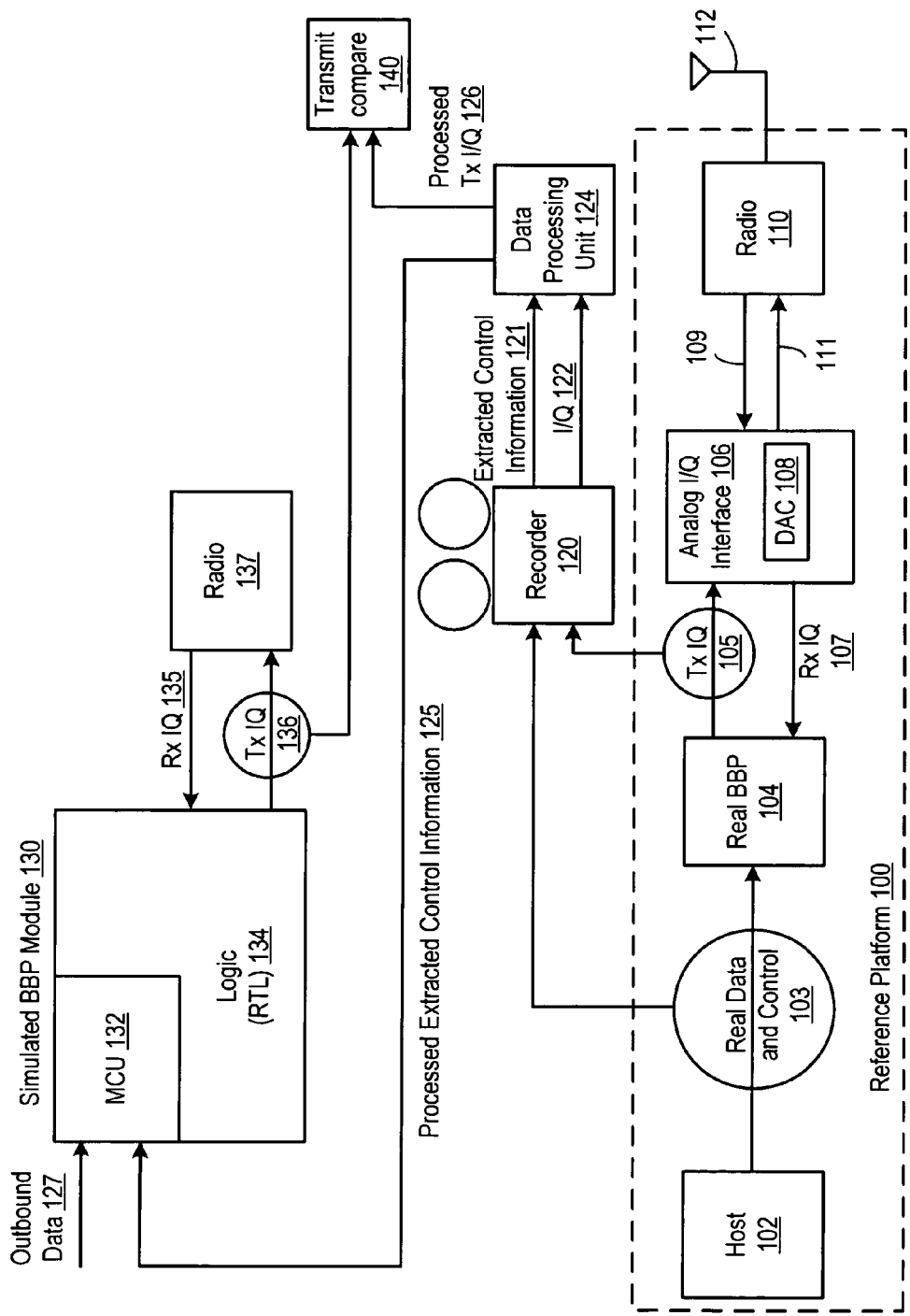
FIG. 2 shows a block diagram representation of an apparatus and method for generating simulation data for stimulus and verification of transmit operations of a software model of an exemplary baseband module.

In an exemplary embodiment depicted in FIG. 2, a software model for a circuit design 130 being verified (e.g., baseband module) may be created using an RTL logic description 134. To test the functionality of the baseband module design, the software model 130 of the baseband module is simulated by running the model 130 on an MCU 132, and the operation results are compared to signals captured from a reference baseband module 104 on a working system platform 100.

In particular and as illustrated in FIG. 2, a reference platform 100 is used as a working system example of a wireless communication device which includes a real host 102 (for generating real output data and control information 103), baseband processing module 104 (for generating digital I/Q transmit data 105), analog I/Q interface 106 (for generating analog I/Q transmit data 109), radio module 110 and antenna 112. As will be appreciated, the actual system components used in the reference platform 100 may be selected on the basis of meeting any desired performance or protocol requirements, though in this example, the baseband processing module 104 is selected on the basis of its operation meeting the target performance requirements of the circuit design being verified. In an illustrative embodiment, the reference platform 100 is an EDGE/GSM system for use in mobile telephony applications.

As indicated with collection taps 103, 105, real-time input and output signals from the real baseband processing module 104 are captured and stored in a recorder device 120 or other memory storage device. Thus, the data captured at the recorder device 120 may include the outbound data and control information 103 that is input to the real baseband processing module 104. As will be appreciated, the outbound control data 103 may include control information pertaining to the signal level, channel frequency, gain, output power, frequency offset, DC offset, or the like, where such control information may be extracted using available extraction algorithms, such as signal analysis to compute signal level, DC offset, frequency offset. In addition, the data captured at the recorder device 120 may include the digital I/Q transmit data 105 that is generated by the baseband processing module 104 that is sent through the analog I/Q interface to the modulator residing in the radio 110.

The captured data 103, 105 may be re-generated at the recorder 120 to provide extracted control information 121 and digital I/Q transmit data 122 for use as stimulus inputs and comparison data in connection with the simulation of the baseband module 130. For example, to simulate the transmit operation of the baseband module 130, the extracted output data and/or control information 121 may be provided as a stimulus input to the software model of the baseband module 130. Alternatively and as indicated at FIG. 2, the extracted output data and/or control information 121 may be processed by a data processing unit (DPU) 124 before being provided as a stimulus input. As a result of the processing at the DPU 124, the processed extracted output data and/or control information 125 may be provided as a stimulus input to the software model for the baseband module 130. As the baseband module design 130 is simulated using these stimulus input, the digital I/Q transmit data 136 is generated, such as would be sent to the radio module 137.

To verify the functionality of the baseband module design 130, the digital I/Q transmit data 136 generated by the simulation is collected and presented as an input to a transmit compare circuit 140, where it is compared with the digital I/Q transmit data generated by the real baseband processing module 104. For example, the recorded digital I/Q transmit data 122 may be provided directly to the transmit compare circuit, or it may first be processed at the DPU 124 to remove non-idealities—such as frequency offset and DC offset—that may be present in the reference platform 100. The non-idealities may also be logged on the reference platform 100. A consequence of logging the real-time signals is that some information may not be logged on the reference platform 100 that needs to be regenerated on software using mathematical analysis.

To the extent that the software model simulation of the baseband module 130 is not run in real-time, the present invention provides that the captured stimulus data may be slowed down during re-generation to be synchronized with the timing requirements of the software model of the baseband module 130. Likewise, to the extent that the digital I/Q transmit data 136 is not generated in real-time, the present invention provides that the captured baseband I/Q samples (e.g., 126) may be slowed down during comparison operations at the transmit compare circuit 140 to be synchronized with the timing requirements of the software model of the baseband module 130.

As described herein, an efficient methodology and system are provided for feeding real simulation data into a software model of the circuit design being verified. Instead of requiring completion of software models for other modules in the system, the present invention captures selected signals from a reference platform for use as stimulus input signals for the particular module under test. In addition, real-time data collected from the reference platform can also be used to check the transmit data generated by the particular module under test.

Figure 3:
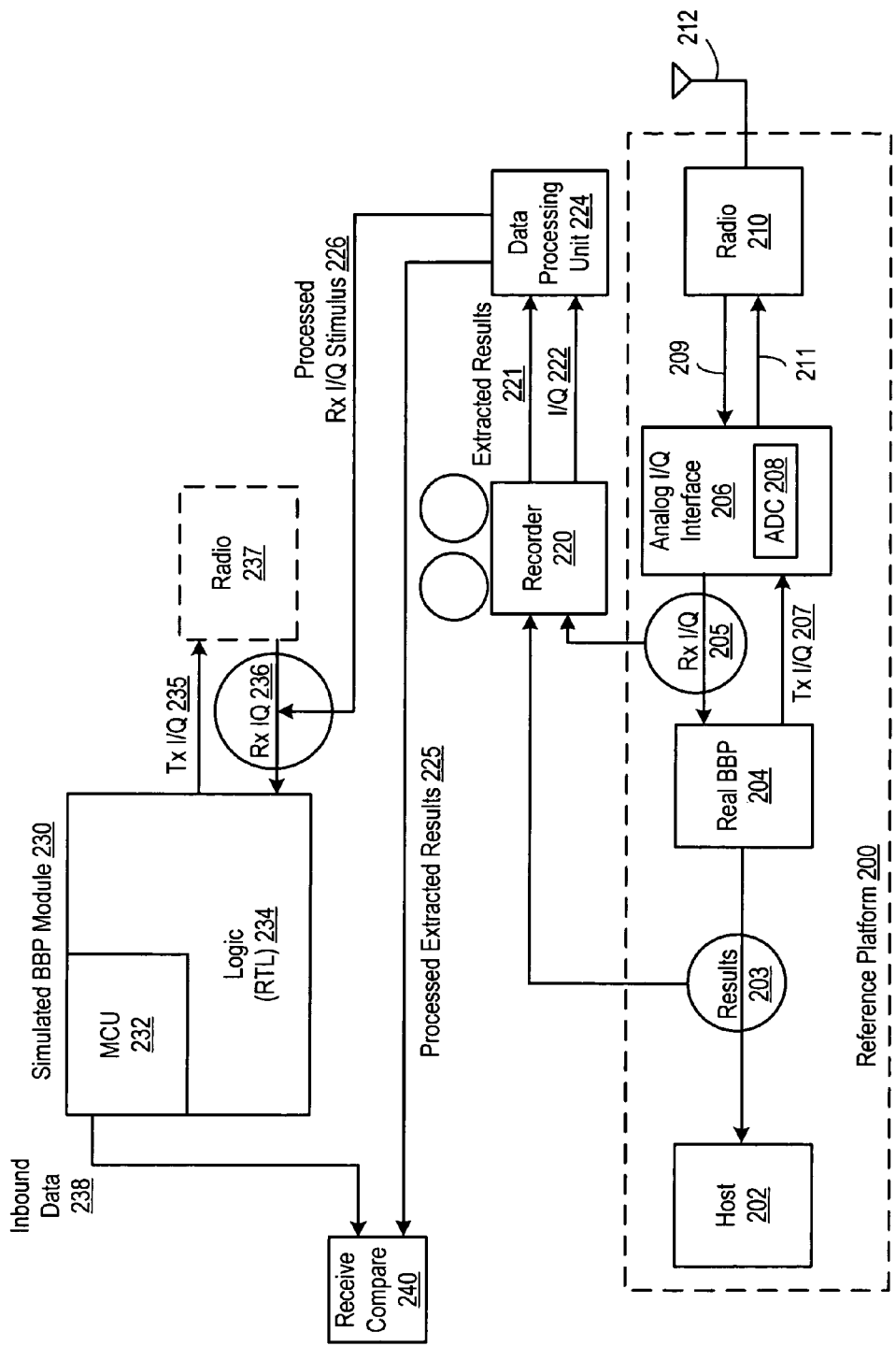
FIG. 3 shows a block diagram representation of an apparatus and method for generating simulation data for stimulus and verification of receive operations of a software model of an exemplary baseband module.

In accordance with an alternative exemplary embodiment depicted in FIG. 3, the receive functionality of a software model for a baseband module circuit design 230 may be verified by simulating an RTL logic description 234 of the circuit design on an MCU 232 and comparing the operation results with signals captured from a reference baseband module on a working system platform 200. In FIG. 3, the reference platform 200 is used as a working system example of a wireless communication device which includes an antenna 212 (for receiving the RF signal), a radio module 210 (for converting the received RF signal to analog I/Q receive data 209), an analog I/Q interface 206 (for generating digital I/Q receive data 205), a baseband processing module 204 (for generating inbound data 203), and a real host 202 (for processing the inbound data 203). Again, it will be appreciated that the actual system components used in the reference platform 200 may be selected on the basis of meeting any desired performance or protocol requirements, such as, for example, an EDGE/GSM system for use in mobile telephony applications.

As indicated with collection taps 205, 203, real-time input and output receive signals from the real baseband processing module 204 are captured and stored in a recorder device 220 or other memory storage device. Thus, the data captured at the recorder device 220 may include the inbound digital I/Q receive data 205 data that is input to the real baseband processing module 204. In addition, the data captured at the recorder device 220 may include inbound data results generated by the baseband processing module 204 that is sent to the host 202.

The captured data 205, 203 may be re-generated at the recorder 220 to provide extracted results 221 and digital I/Q receive data 222 for use as stimulus inputs and comparison data in connection with the simulation of the baseband module 230. For example, to simulate the receive operation of the baseband module 230, the extracted inbound digital I/Q receive data 222 may be provided directly as a stimulus input to the software model of the baseband module 230. Alternatively and as indicated at FIG. 3, the extracted inbound digital I/Q receive data 222 may be processed by a data processing unit 224 to remove non-idealities—such as frequency offset and DC offset—that may be present in the reference platform 200, thereby creating a processed digital I/Q receive stimulus data 226. The non-idealities may also be logged on the reference platform 200.

As the baseband module design 230 is simulated using stimulus input data 226, the inbound data 238 is generated, such as would be sent to a host unit (not shown). To verify the functionality of the baseband module design 230, the inbound data 238 generated by the simulation is collected and presented as an input to a receive compare circuit 240, where it is compared with the data results generated by the real baseband processing module 204. For example, the extracted results 221 may be provided directly to the receive compare circuit 240, or they may first be processed at the DPU 224 before being provided to the receive compare circuit 240.

To the extent that the software model simulation of the baseband module 230 is not run in real-time, the present invention provides that the captured baseband I/Q samples (e.g., 226) may be slowed down during re-generation to be synchronized with the timing requirements of the software model of the baseband module 230. Likewise, to the extent that the inbound data 238 is not generated in real-time, the present invention provides that the inbound data results 238 may be slowed down during comparison operations at the receive compare circuit 240 to be synchronized with the timing requirements of the software model of the baseband module 230.

As will be appreciated, the present invention may be implemented in a computer accessible medium including one or more data structures representative of the circuitry and operations included in the system described herein. Generally speaking, a computer accessible medium may include storage media such as magnetic or optical media, e.g., disk, CD-ROM, or DVD-ROM, volatile or non-volatile memory media such as RAM (e.g., SDRAM, RDRAM, SRAM, etc.), ROM, flash memory, etc., as well as media accessible via transmission media or signals such as electrical, electromagnetic, or digital signals, conveyed via a communication medium such as a network and/or a wireless link. For example, data structure(s) of the circuitry on the computer accessible medium may be read by a program and used, directly or indirectly, to implement the hardware comprising the circuitry described herein. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlist(s) comprising lists of gates from a synthesis library. The netlist(s) comprise a set of gates which also represent the functionality of the hardware comprising the circuitry. The netlist(s) may then be placed and routed to produce one or more data set(s) describing geometric shapes to be applied to masks. The masks may then be used in various semiconductor fabrication steps to produce a semiconductor circuit or circuits corresponding to the circuitry. Alternatively, the data structure(s) on computer accessible medium may be the netlist(s) (with or without the synthesis library) or the data set(s), as desired. In yet another alternative, the data structures may comprise the output of a schematic program, or netlist(s) or data set(s) derived therefrom. While a computer accessible medium may include a representation of the present invention, other embodiments may include a representation of any portion of the circuit simulation and verification techniques described and disclosed herein.

The particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A method for testing a software model of a circuit design module using real-time simulation data, comprising:
    recording real-time input and output data from a target circuit module in a reference platform;
    regenerating the recorded real-time input and output data and applying said regenerated input data as a stimulus input to a software model of a circuit design module during simulation of said circuit design module; and
    comparing the regenerated output data to output data generated from the simulation of said circuit design module to verify the circuit design module functionality.

2. The method of claim 1, where the circuit design module comprises a baseband module in a wireless communication device.

3. The method of claim 1, where the reference platform comprises a reference EDGE/GSM system platform.

4. The method of claim 1, where the regeneration of the recorded real-time input data is synchronized with the simulation of said circuit design module.

5. The method of claim 1, where the real-time output data comprises digital baseband I/Q transmit samples, and where the simulation of said circuit design module comprises simulation of signal transmission by a baseband core.

6. The method of claim 1, where the real-time input data comprises digital baseband I/Q transmit samples, and where the simulation of said circuit design module comprises simulation of signal reception by a baseband core.

7. The method of claim 1, where the regenerating step comprises processing the recorded real-time input data to remove non-idealities present in the data recorded from the reference platform.

8. The method of claim 1, where the real-time output data comprises a digital baseband I/Q transmit signal and the output data generated from the simulation of said circuit design module comprises digital baseband I/Q transmit signal.

9. The method of claim 1, where the real-time output data comprises a baseband module processing results from the reference platform, the output data generated from the simulation of said circuit design module comprises inbound data generated by a simulated baseband module, and the comparing step comprises comparing the results of the inbound data to the baseband module processing results.

10. An article of manufacture having at least one recordable medium having stored thereon executable instructions and data which, when executed by at least one processing device, cause the at least one processing device to perform non-real time software simulation of a circuit model design by:
    storing a representation of a circuit model design;
    retrieving from a storage device real time signals captured from a reference circuit platform;
    performing a simulation of the circuit model design by regenerating at least some of the captured real time signals as an input stimulus signal that is synchronized with the simulation of the circuit model design, thereby generating simulation results; and
    comparing the simulation results with at least some of the captured real time signals to verify the circuit model design.

11. The article of manufacture of claim 10, where the circuit model design comprises a design for a baseband processing module, the reference circuit platform comprises a mobile device comprising a baseband module circuit and the real time signals comprise digital baseband I/Q samples captured as output signals from the baseband module circuit in the mobile device.

12. The article of manufacture of claim 10, where the circuit model design comprises a design for a baseband processing module, the reference circuit platform comprises a mobile device comprising a baseband module circuit and the real time signals comprise digital baseband I/Q samples captured as input signals to the baseband module circuit in the mobile device.

13. The article of manufacture of claim 10, where the real time signals comprise digital baseband I/Q samples that are captured from the reference circuit platform, and the regenerating of at least some of the captured real time signals comprises removing non-idealities present in the captured real time signals.

14. The article of manufacture of claim 10, where the reference circuit platform comprises a baseband module circuit, and where the real time signals comprise input data and control information captured as input signals to the baseband module circuit and digital baseband I/Q samples captured as output signals from the baseband module circuit.

15. The article of manufacture of claim 14, where the input data and control information is regenerated as an input stimulus signal to the circuit model design during simulation of the circuit model design, and where the digital baseband I/Q samples are regenerated and compared to the simulation results to verify the circuit model design.

16. The article of manufacture of claim 10, where the reference circuit platform comprises a baseband module circuit, and where the real time signals comprise output signals captured from the baseband module circuit and digital baseband I/Q samples captured as input signals to the baseband module circuit.

17. The article of manufacture of claim 16, where the digital baseband I/Q samples are regenerated as an input stimulus signal to the circuit model design during simulation of the circuit model design, and where the output signals are regenerated and compared to the simulation results to verify the circuit model design.

18. The article of manufacture of claim 10, where the circuit model design comprises a baseband processor module design, where the reference circuit platform comprises a baseband module circuit, where the real time signals comprise baseband module circuit input data and baseband module circuit output data, and where the baseband module circuit input data is regenerated as an input stimulus signal during simulation of transmit operations of the baseband processor module design, and where the baseband module circuit output data is regenerated and compared to the simulation results to verify the transmit operations of the baseband processor module design.

19. The article of manufacture of claim 10, where the circuit model design comprises a baseband processor module design, where the reference circuit platform comprises a baseband module circuit, where the real time signals comprise baseband module circuit input data and baseband module circuit output data, and where the baseband module circuit input data is regenerated as an input stimulus signal during simulation of receive operations of the baseband processor module design, and where the baseband module circuit output data is regenerated and compared to the simulation results to verify the receive operations of the baseband processor module design.

20. A circuit simulator, comprising:
means for capturing real time input and output data, including digital baseband I/Q samples, from a reference baseband processor module circuit;
means for simulation of a baseband processor module design in response to an input stimulus signal to generate a simulated baseband processor module output signal, where the simulation does not occur in real time;
means for generating the input stimulus signal based on the captured input data and in synchronization with the simulation; and
means for comparing the simulated baseband processor module output signal with the captured output data to verify the baseband processor module design.

* * * * *